(12) United States Patent
Holt et al.

(10) Patent No.: US 8,381,617 B2
(45) Date of Patent: Feb. 26, 2013

(54) DUAL END GEAR FLUID DRIVE STARTER

(75) Inventors: Christopher G. Holt, Katy, TX (US);
William L. Martin, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1007 days.

(21) Appl. No.: 12/162,269

(22) PCT Filed: Feb. 2, 2007

(86) PCT No.: PCT/US2007/003019
§ 371 (c)(1),
(2), (4) Date: Nov. 7, 2008

(87) PCT Pub. No.: WO2007/102964
PCT Pub. Date: Sep. 13, 2007

(65) Prior Publication Data
US 2009/0054191 A1 Feb. 26, 2009

Related U.S. Application Data

(60) Provisional application No. 60/779,680, filed on Mar. 6, 2006.

(51) Int. Cl.
*F16H 37/06* (2006.01)
*F16D 33/00* (2006.01)
(52) U.S. Cl. .......................... 74/665 R; 60/330; 60/335
(58) Field of Classification Search .............. 74/665 R; 60/330, 335, 778, 787; 62/330, 611
See application file for complete search history.

(56) References Cited

U.S. PATENT DOCUMENTS

| 2,194,054 A | | 3/1940 | Peterson |
| 2,301,645 A | | 11/1942 | Sinclair |
| 2,377,851 A | * | 6/1945 | Blank ............................. 60/358 |
| 2,425,885 A | * | 8/1947 | Jennings ........................ 417/47 |

(Continued)

FOREIGN PATENT DOCUMENTS

| EP | 0529307 A1 | 3/1993 |
| EP | 0963035 A2 | 12/1999 |

(Continued)

OTHER PUBLICATIONS

Hallock, D. C. et al. (1972) "Compressors & Drivers for LNG Plants", *Chemical Engineering Process*, Sep. 1972, pp. 77-82, vol. 68(9).

(Continued)

*Primary Examiner* — Tisha Lewis
(74) *Attorney, Agent, or Firm* — ExxonMobil Upstream Research Co. Law Dept.

(57) ABSTRACT

A compressor starting torque converter method and apparatus for high power rotating equipment strings includes a compressor starting torque converter (CSTC) (16) and gearing to make the input and output speed conform to the speed and power requirements of the at least one compressor (4) at the end of the string. The string also includes a prime mover (10), either a motor or gas turbine with a starter motor. The CSTC is driven by a prime mover that has been geared down (via 18) to an appropriate speed for efficient power transfer, followed by a gear increasing unit (20) to allow the output of the CSTC to be increased to conform to the necessary requirements of a high speed compressor. The gearing can be two separate units with their own housings, or incorporated in a single housing with the CSTC. The CSTC may be a CSTC used in pressurized starts high compressor load strings for LNG refrigeration service.

23 Claims, 3 Drawing Sheets

U.S. PATENT DOCUMENTS

| | | | |
|---|---|---|---|
| 2,547,660 A | | 4/1951 | Prince |
| 2,585,968 A | * | 2/1952 | Schneider ................. 60/608 |
| 3,043,162 A | | 7/1962 | Kugel et al. |
| 3,375,663 A | * | 4/1968 | Ludwig ........................ 60/334 |
| 3,677,033 A | | 7/1972 | Kneeland |
| 3,724,226 A | | 4/1973 | Pachaly |
| 3,735,600 A | | 5/1973 | Dowdell et al. |
| 3,764,815 A | | 10/1973 | Habock et al. |
| 3,780,534 A | | 12/1973 | Lofredo et al. |
| 3,886,729 A | | 6/1975 | Amann et al. |
| 3,888,082 A | | 6/1975 | Haide |
| 3,919,837 A | | 11/1975 | Pradt et al. |
| 3,955,365 A | | 5/1976 | Arao |
| 4,073,139 A | | 2/1978 | Armasow et al. |
| 4,077,743 A | | 3/1978 | Cochrane et al. |
| 4,077,748 A | | 3/1978 | Potz |
| 4,082,011 A | | 4/1978 | McQuinn et al. |
| 4,117,343 A | | 9/1978 | Hoffeins |
| 4,119,861 A | | 10/1978 | Gocho |
| 4,220,057 A | | 9/1980 | Kronogärd |
| 4,359,871 A | | 11/1982 | Strass |
| 4,389,842 A | | 6/1983 | Behnert |
| 4,404,812 A | | 9/1983 | Zinsmeyer |
| 4,434,613 A | | 3/1984 | Stahl |
| 4,503,666 A | | 3/1985 | Christoff |
| 4,566,885 A | | 1/1986 | Haak |
| 4,686,822 A | | 8/1987 | Frutschi |
| 4,726,255 A | * | 2/1988 | Humpfer et al. .............. 475/34 |
| 4,848,084 A | | 7/1989 | Wirtz |
| 4,951,467 A | | 8/1990 | Walsh et al. |
| 4,964,843 A | | 10/1990 | Wahl |
| 5,123,239 A | | 6/1992 | Rodgers |
| 5,491,969 A | | 2/1996 | Cohn et al. |
| 5,689,141 A | | 11/1997 | Kikkawa et al. |
| 5,966,925 A | | 10/1999 | Torikai et al. |
| 5,989,156 A | | 11/1999 | Matsubara et al. |
| 6,068,452 A | | 5/2000 | Okada et al. |
| 6,070,429 A | | 6/2000 | Low et al. |
| 6,324,867 B1 | | 12/2001 | Fanning et al. |
| 6,367,286 B1 | | 4/2002 | Price |
| 6,393,867 B1 | | 5/2002 | Guillard |
| 6,446,465 B1 | | 9/2002 | Dubar |
| 6,484,490 B1 | | 11/2002 | Olsen et al. |
| 6,622,473 B2 | * | 9/2003 | Becquerelle et al. ........ 60/226.1 |
| 6,640,586 B1 | | 11/2003 | Baudat et al. |
| 6,691,531 B1 | | 2/2004 | Martinez et al. |
| 6,724,099 B2 | | 4/2004 | Klaar |
| 6,725,657 B1 | * | 4/2004 | Kimura et al. ................. 60/339 |
| 6,732,529 B2 | | 5/2004 | Anderson |
| 6,743,829 B2 | * | 6/2004 | Fischer-Calderon et al. . 518/700 |
| 6,782,982 B2 | | 8/2004 | Wahl et al. |
| 6,838,779 B1 | | 1/2005 | Kandil et al. |
| 6,860,726 B2 | * | 3/2005 | Carter, III et al. ............ 417/319 |
| 7,198,142 B2 | | 4/2007 | Wahl et al. |
| 7,422,543 B2 | * | 9/2008 | Ransbarger et al. ............ 477/53 |
| 7,691,028 B2 | * | 4/2010 | Hattenbach et al. ............ 477/55 |
| 2001/0004830 A1 | | 6/2001 | Wakana et al. |
| 2002/0067042 A1 | | 6/2002 | Alvarez Orgega et al. |
| 2002/0077512 A1 | | 6/2002 | Tendick et al. |
| 2002/0114985 A1 | | 8/2002 | Shkolnik et al. |
| 2003/0052485 A1 | | 3/2003 | Poteet et al. |
| 2003/0074900 A1 | | 4/2003 | McFarland |
| 2004/0107703 A1 | | 6/2004 | Gustafson |
| 2007/0060442 A1 | | 3/2007 | Ransbarger et al. |
| 2009/0260367 A1 | * | 10/2009 | Martin et al. ................... 60/778 |

FOREIGN PATENT DOCUMENTS

| | | |
|---|---|---|
| GB | 24349 A | 6/1915 |
| GB | 1208831 | 10/1970 |
| WO | WO02/12692 A1 | 2/2002 |
| WO | WO2007/078418 A2 | 7/2007 |

OTHER PUBLICATIONS

Hobi, Joseph (1996) "Technologie des moteurs electriques a vitesse variable", *Petrole et Techniques*, Aug.-Sep. 1996, 7 pages, No. 403.

Kleiner, F. et al. (2003) "Increase power and efficiency of LNG refrigeration compressor drivers", *Hydrocarbon Processing*, Jan. 2003, pp. 67-69.

Meissner Bolte & Partners, Civil Action No. 1347/05LH between Voith Turbo GmbH & Co. KG and Phillips Petroleum Company, Dec. 19, 2005, 20 pgs.

Piekert, G. H. et al. (1996) "Use of Modern Multi-Stage Variable Speed Drives for the Drive of Gas Compressors in PTT's (Petroleum Authority of Thailand) Gas Separating Plant No. 3 and Parallel Gas Pipeline", *Oil Gas—European Magazine*, Apr. 1996, pp. 22, 24-25.

Tanaka, H. (1993) "AC drive replacing and fusing with machine power sources", *Sho-Enerugi*, Sep. 30, 1993, pp. 24-28, v. 45(11).

Voith Turbo, Compressor Starting Torque Converter Vosycon, product brochure 6 pages.

Wahl, G. et al. (1990) "Torque Converter Used as Gas Turbine Starting Device—Stage of Development and Parameters", *4th International Symposium on Gas Turbines in Cogeneration, Repowering and Peak Load Power Generation*, ASME, International Gas Turbine Institute, Aug. 1990, pp. 165-172, v5.

European Search Report No. 113889, Aug. 16, 2006, 3 pages.

* cited by examiner

DUAL END GEAR FLUID DRIVE STARTER

CROSS REFERENCE TO RELATED APPLICATIONS

This application is the National Stage of International Application No. PCT/US07/03019, filed 2 Feb. 2007, which claims the benefit of U.S. Provisional Application No. 60/779,680, filed 6 Mar. 2006.

This application is related to U.S. Provisional No. 60/753,717, entitled Multi-Compressor String With Multiple Variable Speed Fluid Drives, filed Dec. 23, 2005 by Christopher G. Holt and William L. Martin. U.S. Provisional No. 60/753,717 was subsequently filed as International Application No. PCT/US2006/043287 on 8 Nov. 2006.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

The present invention generally concerns a method for starting large rotating equipment. More specifically, it concerns a compressor starting torque converter for a string of equipment. The starter is required for initiating a large motor or turbine to drive a compressor or a multiplicity of compressors. The compressor string may be useful in large scale liquefied natural gas (LNG) refrigeration.

Figure 1:
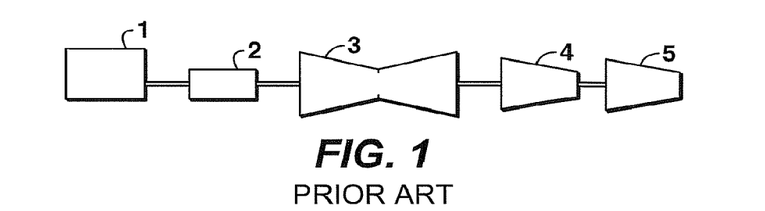
FIG. 1 is a schematic view of an equipment string using a variable frequency drive.

Combinations of high speed, high power rotating equipment (e.g. turbines, electric motors, and compressors) in serial combination (a.k.a. "strings") generally require separate starters to initiate operation due to numerous factors such as: the large moment of inertia, parasitic losses, break-away torque, windage, compression load, and other resistance associated with the rotating equipment. A typical string in a facility may have a gas turbine or motor driver connected to a compressor, multiplicity of compressors, generator, or any another rotating machinery based load. A starter mechanism, such as a low power starting motor, may also be connected to the string. FIG. 1 shows an example of a typical string with a gas turbine 3 mechanical drive and compression load, including a first compressor 4 and a second compressor 5, with a variable frequency drive (VFD) 1 with starter motor (S/M) 2. The VFD 1 is an electric device that inverts fixed alternating current (AC) line input voltage to direct current (DC) and converts DC voltage to user defined output AC. The VFD 1 produces a user selectable variable frequency output, thereby providing variable speed for the S/M 2. As a result, large inertial loads are started with limited controlled in-rush current as opposed to across-the-line starts in synchronous motors with damper bars which may draw up to six times (load dependent) the motor rated current for continuous duty operation.

Figure 2:
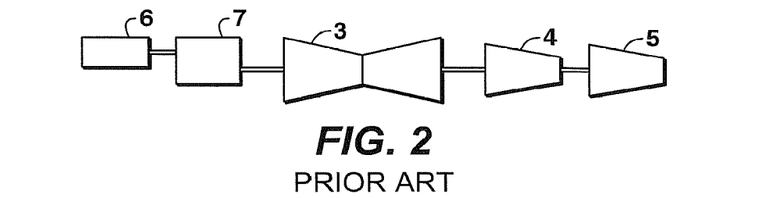
FIG. 2 is a schematic view of another equipment string using a variable speed hydraulic clutch and a starter motor.

FIG. 2 schematically illustrates a typical across-the-line starter motor (S/M) 6 with a variable speed hydraulic clutch (HC) 7. The across-the-line (S/M) 6 with HC 7 is another mechanism for starting large inertial loads. The HC 7 operates as a mechanical VFD. The across-the-line S/M 6 is started with the HC 7 disengaged and thus with no load. Once the S/M 6 is at full speed, the HC 7 is engaged, providing variable speed (zero to full speed) and necessary torque to bring the gas turbine 3 and other connected load(s) (e.g. a first and second compressor 4, 5) to full speed. Once the gas turbine 3 achieves sufficient speed to produce power, the HC 7 is disengaged and the S/M 6 is electrically removed from service.

Starting a string may be achieved under one of two primary conditions. The first condition is a depressurized start, and the second is a pressurized start. A depressurized start initiates at a low settle-out pressure within the compressor(s). For a depressurized start, the working gas is removed from the compressor(s). The working gas is replaced, the method for replacement being known as gas make-up. Gas make-up may require extra facility hardware (valves, piping, transmitters, flares, gas reclamation, and associated controls) and is a time consuming effort. Due to the lengthy time requirement and extra facility cost to make-up gas in a depressurized start, a pressurized start is an attractive alternative. A pressurized start initiates with a high settle-out pressure within the compressor(s) compared to depressurized start. A pressurized start removes necessary hardware associated with the gas make-up of depressurized start; however, it requires additional starting power due to a higher starting torque necessitated by gas in the compressor causing a higher internal compressor load.

There are generally two types of turbines, dual-shaft and single-shaft. Dual-shaft gas turbines produce compression for the combustion process with a compressor driven by a low count (e.g. 2 or 3) stage turbine on a single shaft. The remaining thermodynamic power in form of pressure, temperature, and mass flow is routed directly into the coaxial power turbine on a second shaft. An advantage of a dual-shaft gas turbine is the ability to produce significant power (torque) across the turbine's speed range. However, as compressor string power requirements have increased, the demand for larger power gas turbines has also increased. To meet these power requirements, users have adapted single shaft gas turbine technology traditionally used in power generation for mechanical drive service.

For very large motors or turbines under a pressurized start, an across the line starter motor, as shown in FIG. 2, is insufficient. Accordingly, variable frequency drives (VFD) provide the startup power. However, a VFD is a large capital expense and may contribute up to 70% of the cost in a motor/VFD package. A mechanical alternative to starting a compression string is the variable speed fluid drive. A variable speed fluid drive is a constant speed input, variable speed output device that transmits power (torque) from the input shaft to the output shaft via a fluid (hydraulic) coupling. A more common name for a variable speed fluid drive is a compressor starting torque converter (CSTC). A CSTC generally includes a synchronous speed lockup feature, which allows the drive end and the driven end of the CSTC to mechanically engage and enable rigid rotation between the prime mover and the load(s) at synchronized speed.

Figure 3:
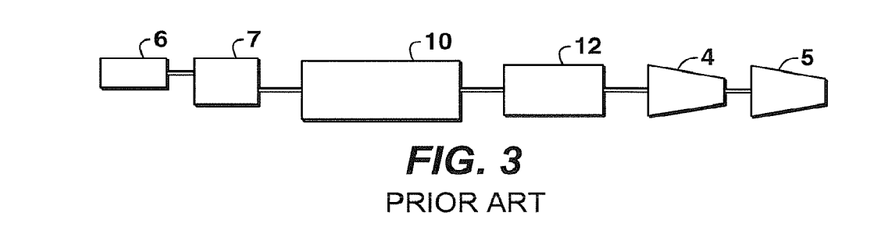
FIG. 3 is a schematic view of the equipment string of FIG. 2 using a CSTC between the turbine and at least one compressor.

FIG. 3 depicts another known system comprising a prime mover 10 (e.g. gas turbine or electric motor) with a CSTC 12. The CSTC 12 eliminates the need for a VFD in a motor driven string and eliminates the need for a starter/helper motor and VFD in a gas turbine driven string. However, a S/M 6 with a HC 7 or starter motor VFD is required in either case to start the string. The starting package of a prime mover 10 (e.g., gas turbine or motor) can be either a S/M 6 with HC 7 or a starter motor with starter motor VFD. Either starting package may be interchangeably used with any prime mover type, such as, for example, a gas turbine or motor. U.S. Pat. No. 6,463,740, issued Oct. 15, 2002 to Schmidt et al. is an example of a CSTC in a string. The CSTC of Schmidt is coupled to a gas turbine and a compressor, but is incapable of starting up a compressor string of over 50,000 horsepower (hp) (less than 40 megawatts (MW)).

Power to speed performance of the CSTC is limited. Certain applications require more power at a given speed than CSTC technology can presently support. In a depressurized start, where the loads in a compressor string are reduced, a CSTC may be capable of performing a start; however, CSTC technology alone is power-limited in starting high load compressor strings such as pressurized starts in high-load compressor strings. The CSTC power output decreases as its speed increases. Given the high speed requirement of current high power compressors, the CSTC is not capable of outputs at the necessary speed and power. The present invention seeks to mitigate this shortcoming.

Other related material may be found in at least U.S. Pat. Nos. 2,377,851; 3,043,162; 3,886,729; and 3,955,365; and G.B. Pat. No. 1,208,831.

SUMMARY OF THE INVENTION

In one embodiment of an apparatus of the present invention, a string of rotating power equipment is provided. The string of rotating power equipment comprising a prime mover having an output shaft; a speed reducing gear train connected to said prime mover, said speed reducing gear train having an output shaft and an input shaft, said speed reducing gear train output shaft rotating at a lower speed than said prime mover output shaft; a compressor starting torque converter (CSTC) connected to said speed reducing gear train output shaft, wherein the CSTC includes an output shaft; a speed increasing gear train connected to said CSTC output shaft and having a speed increasing gear train output shaft rotating at a higher speed than said CSTC output shaft; and a driven load connected to said speed increasing gear train output shaft, wherein the rotation speed of said CSTC output shaft can be increased by said speed increasing gear train to meet the operating speed requirement of said driven load. According to a further aspect of the invention, the prime mover may be a motor. Alternatively, the prime mover may be a turbine. The turbine may be a single shaft turbine. The driven load may be a compressor. The compressor may be pressurized or depressurized at start up. The compressor may be an LNG compressor. One use for this CSTC and gearing arrangement is for a liquefied natural gas (LNG) refrigeration compression string that may require from about 80 megawatts (MW) to about 150 MW of power at about 2,500 revolutions per minute (rpm) to about 4,000 rpm.

In a second embodiment of an apparatus of the present invention a dual end gear compressor starting torque converter (CSTC) for use in a string of rotating machines is provided. The dual end gear CSTC comprises a CSTC; an input end and an output end; a lock-up mechanism for mechanically connecting the CSTC input end to the CSTC output end at synchronous speed (which allows the drive end and the driven end of the CSTC to mechanically engage and enable rigid rotation between the prime mover and the load(s) at synchronized speed) between the input end and the output end; a speed reducing gear train at the input end; and a speed increasing gear train at the output end. A housing may surround and enclose the entire dual end gear CSTC assembly, or separate housings may be utilized. The speed increasing gear train and speed reducing gear train may each be of single helix construction, or may each be of double helix construction.

In a third embodiment of an apparatus of the present invention a rotating equipment power string for use in process refrigeration service (e.g. compressing natural gas to form liquefied natural gas (LNG)) including a compressor starting torque converter (CSTC) is provided. The rotating equipment power string comprising a single shaft gas turbine having an input shaft and an output shaft; at least one process refrigeration compressor with an input shaft and a nominal speed requirement; a starter motor operatively connected to said turbine input shaft; and a CSTC and gearing assembly for delivering power from said single shaft gas turbine to said at least one process refrigeration compressor. The CSTC and gearing assembly comprising a CSTC having a constant speed input shaft to a hydraulic pump; said hydraulic pump supplying hydraulic fluid to a hydraulic turbine through adjustable guide vanes; said hydraulic turbine being connected to a CSTC output shaft such that the speed of the output shaft increases from zero to full speed by adjusting said guide vanes; said CSTC further comprising a lock-up mechanism for mechanically connecting said CSTC input shaft to said CSTC output shaft at synchronous speed. The apparatus further includes a speed reducing gear train including a speed reducing gear train input shaft connected to a high speed gear, said high speed gear mechanically meshed to a low speed gear carried by a speed reducing gear train output shaft, wherein said speed reducing gear train output shaft is connected to said CSTC input shaft; and a speed increasing gear train including a speed increasing gear train input shaft, wherein said speed increasing gear train input shaft is connected to said CSTC output shaft, a low speed gear connected to said speed increasing gear train input shaft, and a high speed gear mechanically meshed to said low speed gear, wherein said high speed gear is connected to a speed increasing gear train output shaft that is connected to said process refrigeration compressor input shaft.

In a fourth embodiment of the present invention, a method of starting at least one compressor in a string of rotating power equipment is provided. The method comprising providing a string of rotating power equipment including a prime mover; connecting a speed reducing gear train to said prime mover; connecting a compressor starting torque converter (CSTC) to said speed reducing gear train; connecting a speed increasing gear train to said CSTC; connecting at least one compressor to said speed increasing gear train; starting said prime mover to produce power at a first output speed; reducing said first speed to a second speed lower than said first speed by said speed reducing gear train; transmitting power increasingly through said CSTC at output speeds from zero to said second lower than said first speed; increasing said second speed to a third speed higher than said second speed by said speed increasing gear train; and driving said compressor at said third speed. The pressurized start preferably starts up at minimum startup power and transitions to full power when the speed increasing gear train reaches the said third speed.

In a fifth embodiment of the present invention, a method of manufacturing LNG using a string of rotating power equipment is provided. The string of rotating power equipment comprises a prime mover having an output shaft; a speed reducing gear train connected to said prime mover, said speed reducing gear train having an output shaft and an input shaft, said speed reducing gear train output shaft rotating at a lower speed than said prime mover output shaft; a compressor starting torque converter (CSTC) connected to said speed reducing gear train output shaft, wherein the CSTC includes an output shaft and a lock-up mechanism for mechanically connecting the compressor starting torque converter input shaft to the compressor starting torque converter output shaft at synchronous speed; a speed increasing gear train connected to said CSTC output shaft and having a speed increasing gear train output shaft rotating at a higher speed than said CSTC output shaft; and a driven load connected to said speed increasing gear train output shaft, wherein the rotation speed of said CSTC output shaft can be increased by said speed increasing gear train to meet the operating speed requirement of said driven load. The prime mover may be a single shaft turbine or a motor.

In a sixth embodiment of the present invention, a method of manufacturing LNG utilizing a dual end gear compressor starting torque converter (CSTC) in a string of rotating machines is provided. The dual end gear CSTC comprises a compressor starting torque converter (CSTC); an input end and an output end; a lock-up mechanism for mechanically connecting the CSTC input end to the CSTC output end at synchronous speed between the input end and the output end; a speed reducing gear train at the input end; and a speed increasing gear train at the output end.

In a seventh embodiment of the present invention, a method for manufacturing LNG is provided. The method comprises providing natural gas and providing a string of rotating power equipment. The string of rotating power equipment comprising a prime mover having an output shaft, a speed reducing gear train connected to said prime mover, said speed reducing gear train having an output shaft and an input shaft, said speed reducing gear train output shaft rotating at a lower speed than said prime mover output shaft; a compressor starting torque converter (CSTC) connected to said speed reducing gear train output shaft, wherein the CSTC includes an output shaft; a speed increasing gear train connected to said CSTC output shaft and having a speed increasing gear train output shaft rotating at a higher speed than said CSTC output shaft; and a compressor connected to said speed increasing gear train output shaft, wherein the rotation speed of said CSTC output shaft can be increased by said speed increasing gear train to meet the operating speed requirement of said compressor. The method further comprises feeding a refrigerant to said compressor; compressing said refrigerant in said compressor, thereby forming a compressed refrigerant; expanding said compressed refrigerant to form a cooled refrigerant; cooling said natural gas by indirect heat exchange with said cooled refrigerant; and recovering LNG.

BRIEF DESCRIPTION OF THE DRAWINGS

As a preliminary matter, it should be noted that the drawings presented below are not shown to scale and that size and thickness of the various elements have been chosen to facilitate a better understanding of the drawings. The foregoing and other advantages of the present invention may become apparent upon reviewing the following detailed description and drawings of non-limiting examples of embodiments in which.

DETAILED DESCRIPTION OF THE PRESENT INVENTION

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Some embodiments of the present invention relate to a mechanical technique to start a string. Starting a string may be achieved by one of two primary conditions. The first condition is depressurized start, and the second is pressurized start. A pressurized start (e.g. at settle out pressure) removes necessary hardware associated with the depressurized start. However, it requires additional starting power due to higher starting torque. At least one aspect of the present invention contemplates providing an alternative technology for starting compression loads of prime movers. In at least one preferred embodiment, the present invention contemplates integrated application of at least one CSTC coupled to at least one speed-reducing gearbox at an input drive shaft of the CSTC and at least one speed-increasing gearbox at an output drive shaft of the CSTC as a starting package for at least one compressor. The apparatuses, systems and methods of the present invention may advantageously be utilized in combination with a pressurized start for large liquefied natural gas (LNG) compressors.

For depressurized starts, aero-drag within the compressors is relatively low, and starting torque is primarily dependent upon total string inertia with secondary effects from external losses. External losses ($T(\omega)_{ext}$) are defined as being all drag torque external to compressor internal drag (i.e. bearings, seals, turbine blading aero-drag). For comparison purposes, all internal aero-drag due to the compressor will be considered negligible for depressurized starts. Aero-drag is directly proportional to rotational speed raised to a power ($T \sim \omega^n$), where $\omega$ is string rotational speed and $2 \leqq n \leqq 3$. Equation 1 shows the torque, acceleration, and external losses relationship for a depressurized start.

$$T = J\alpha + T(\omega)_{ext} \quad (1)$$

T is string torque, J is string rotating inertia, and $\alpha$ is rotational acceleration. As rotational acceleration increases, starter motor torque and power must also increase; however, time to achieve full speed is decreased. Therefore, time to achieve full speed is a function of acceleration, and acceleration is a function of starter motor power. However, the starter motor must be sized to overcome external losses at full speed as a minimum.

Equation 2 shows the torque, acceleration, speed, external losses, and compressor aero-drag relationship for a pressurized start where $T(\omega)_{comp}$ is the aero-drag torque of the compressor(s). In comparison with equation 1, equation 2 clearly shows higher torque requirements for a pressurized start with the additional term.

$$T = J\alpha + T(\omega)_{ext} + T(\omega)_{comp} \quad (2)$$

In all cases, properly sized starting machinery is required to perform start-ups of strings. Two types of prime movers are commonly used for starting; turbines and motors. Turbines may be used as in the case described by FIG. 1. Motors are commonly used to start turbines since turbines (single-shaft) have a small speed range to produce significant power (i.e. 92~103% of full speed).

The power required to start and run a compressor is determined by the relationship of flow to differential pressure. A compressor will be started at the lowest starting power, which will generally be a low differential pressure and high flow. As the compressor comes to a steady-state operation, the differential pressure will increase, the flow will generally decrease and the power will increase until nominal operating parameters have been achieved.

Figure 4:
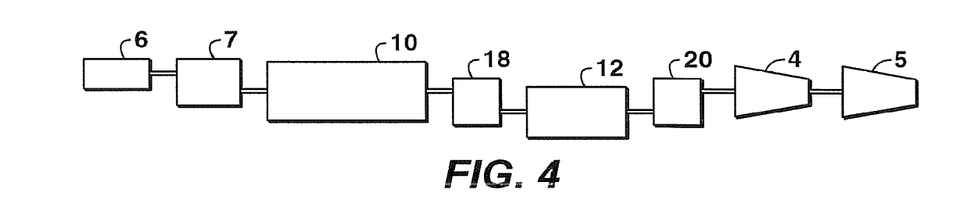
FIG. 4 is a schematic view of an exemplary embodiment of the dual end gear compressor starting torque converter of the present invention in a string of rotating equipment.

Turning now to the drawings, FIG. 4 schematically shows a power string including a prime mover (gas turbine or motor) 10 utilized to drive at least one compressor 12. Although two compressors are shown, any number of compressors may be utilized with the present invention. A starter motor 14 connected by a hydraulic clutch 15 to the prime mover. The output of the prime mover may be connected to the input of a CSTC 16 by a gear reducer 18. The output of the CSTC may be connected to the compressors 12 by a gear increasing unit 20. Using this arrangement, the prime mover output shaft rotating at high speed may be connected to the speed reducer or decreasing gear 18 to transmit torque and speed. The gearing transmits the power at a lower speed at its output to the CSTC 16. At this reduced input speed, the CSTC transmits the power with variable speed, from zero speed to a full reduced output speed. The output of the CSTC is then increased in speed by the gear increasing unit 20 to match the necessary speed input to the compressors 12.

The CSTC 16 is a compressor starting torque converter having an input shaft and an output shaft capable of transmitting power from zero to a lock-up speed at which the input and output shafts have the same speed. A CSTC generally includes a lock-up mechanism for mechanically connecting the compressor starting torque converter input shaft to the compressor starting torque converter output shaft at synchronous speed, which allows the drive end and the driven end of the CSTC to mechanically engage and enable rigid rotation between the prime mover and the load(s) at synchronized speed. Some additional details of a CSTC are disclosed in U.S. Pat. No. 6,463,740 to Schmidt et al issued Oct. 15, 2002, the portions of which dealing with the CSTC are hereby incorporated by reference. The CSTC of Schmidt is coupled between a gas turbine and a compressor, but is incapable of starting up a compressor string of over 50,000 horsepower (hp) (less than 40 megawatts (MW)).

Figure 5:
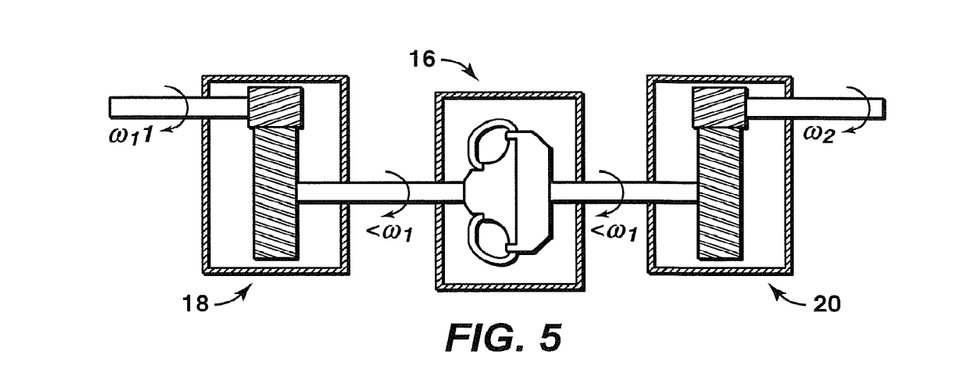
FIG. 5 is a diagram, partly in section, showing individual components of the gearing and CSTC of the exemplary embodiment of FIG. 4.

The schematic illustration in FIG. 5 shows an exemplary series connection of the gear reducer 18 followed by the CSTC 16 whose output is transmitted to the gear increaser 20. Note that in this arrangement, each of the components includes a separate housing.

Figure 6:
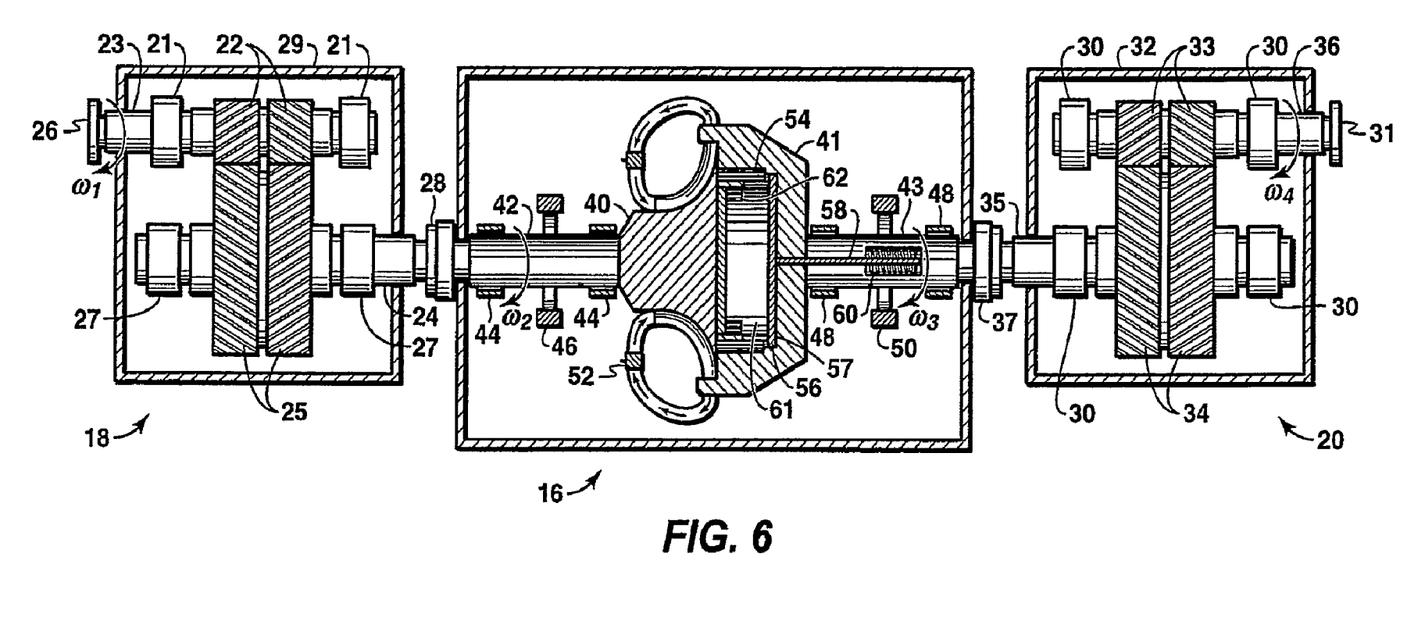
FIG. 6 is a diagram, partly in section, showing the gearing and the CSTC of the exemplary embodiment of FIG. 4.

One preferred embodiment of the gear reducer 18 may be seen in FIG. 6. The gear input-shaft 23 is connected directly to a prime mover with shaft rotational speed $\omega_1$ through the coupling flange 26. The high-speed gear 22 (pinion gear) is integral with the gear input-shaft 23 and is of double helix construction. The gear input-shaft 23 is supported by two fluid film bearings 21. The gear output-shaft 24 is connected directly to the output load (CSTC input-shaft 42) with shaft rotational speed $\omega_2$ through the coupling flange 28. The low-speed gear 25 is integral with the gear output-shaft 24 and is also of double helix construction. The output-shaft is supported by two radial fluid film bearings 27. The entire unit is enclosed in a gear casing or housing 29.

An exemplary embodiment of the speed increasing gear 20 is shown in FIG. 6, which includes a gear input-shaft 35 directly connected to the CSTC output-shaft 43, with shaft rotational speed $\omega_3$ through the coupling flange 37. The low-speed gear 34 is integral with the gear input-shaft 35 and may be of double helix construction. The gear input-shaft 35 may be supported by two fluid film bearings 30. The gear output-shaft 36 is directly connected to the output load (a compressor or compressors) with shaft rotational speed $\omega_4$ through the coupling flange 31. The high-speed gear (pinion gear) 33 is integral with the gear output-shaft 36 and may also be of double helix construction. The output-shaft is supported by two radial fluid film bearings 30. Housing 32 encloses the gear increasing unit.

Some exemplary elements of the compressor starting torque converter (CSTC) 16 of the present invention are also shown in FIG. 6. The compressor starting torque converter comprises a pump 40 and a turbine 41. The working fluid of the compressor starting torque converter is preferably incompressible lube oil (e.g. ISO VG 32 or 46), but may be a similar incompressible fluid. The pump 40 is preferably rigidly connected to the CSTC input shaft 42. The CSTC input shaft 42 may be supported by at least one radial fluid film bearing 44 (e.g. tilt-pad type) and a fluid film thrust bearing 46 (e.g. tilt-pad type). The CSTC input shaft 42 may further include a flange-mount type coupling connection to the gear reducer output flange 28. The hydraulic turbine 41 is rigidly connected to the CSTC output shaft 43 and is supported by at least one radial fluid film bearing 48 (e.g. tilt-pad type) and a fluid film thrust bearing 50 (e.g. tilt-pad type). CSTC output shaft 43 may further include a flange-mount type coupling connection to connect directly to the gear increasing unit input flange 37. The working fluid may be recycled in the compressor starting torque converter through an external heat exchanger (not shown). Adjustable inlet guide vanes 52 direct the flow of the working fluid into the pump 40.

At least one exemplary embodiment of the compressor starting torque converter (CSTC) 16 of the present invention includes a lock-up device comprising three ring gears 54, 61, 62, a pressure plate 56 and pressure cylinder 57, push rod 58, and a restoring spring 60. The three ring gears 54, 61, 62 include an outer ring gear 54 having teeth on the inner diameter, which is preferably rigidly connected to the CSTC output shaft 43, an intermediate sliding ring gear 61 with teeth on both the inner and outer diameter, which is preferably rigidly connected to the adjustable pressure plate 56 and push rod 58 assembly, and an inner ring gear 62 with teeth on the inner diameter preferably rigidly connected to the CSTC input shaft 42. The restoring spring 60 preferably connects the end of the push rod 58 to the CSTC output shaft 43. The restoring spring 60 may provide a constant restoring or disengaging force to the moveable intermediate sliding gear 61 pressure plate 56-push rod 58 assembly. Working fluid (e.g. lube oil) is pumped into the pressure cylinder 57 to provide a moving or engaging force to actuate the intermediate ring gear 61 into position between the outer ring gear 54 and inner ring gear 62.

Some embodiments of the present invention include various methods of operation. One exemplary method comprises pressurizing the compressor starting torque converter (CSTC) 16 using the working fluid and closing the adjustable inlet guide vanes 52 to prevent working fluid circulation through the pump 40 and hydraulic turbine 41. A pre-determined minimum pressure is utilized to prevent working fluid cavitation in the pump 40. The CSTC input shaft 42 is accelerated to the full speed of the gear reducing output shaft 24. With the CSTC input shaft 42 at full speed, the adjustable inlet guide vanes 52 are slowly opened to allow the working fluid to circulate in the CSTC 16. Increasing the opening of the adjustable guide vanes 52 provides increasing power flow from the pump 40 to the hydraulic turbine 41, thus increasing torque on the CSTC output shaft 43 until the adjustable inlet guide vanes 52 are in the fully open position where maximum power (torque) is transmitted to the CSTC output shaft 43. As power is increased in the CSTC 16, the CSTC output shaft 43 accelerates from zero speed to full speed of the CSTC input shaft 42. The adjustable inlet guide vanes 52 are designed to enable the CSTC output shaft 43 to accelerate to a speed slightly higher than the CSTC input shaft 42 speed. With the CSTC output shaft 43 speed ($\omega_3$) higher than the CSTC input shaft 42 speed ($\omega_2$), and within a design limiting speed differential (synchronizing speed), the lock-up device may be engaged.

In some embodiments of the present invention, the lock-up device may be engaged by pumping working fluid, preferably lube oil, into the pressure cylinder 57 of the lock-up device. The working fluid may be supplied at working fluid delivery system pressures known to those of skill in the art (2~3 bar). The rotation of the lock-up device provides a centrifugal body force on the working fluid in the pressure cylinder 57 that reacts with the pressure plate 56 as an increase in working fluid static pressure (higher than lube oil system delivery pressure). The working fluid pressure provides a counteracting force against the restoring spring 60 that causes the intermediate ring gear 61-pressure plate 56-push rod 58 assembly to engage with the inner ring gear 62 of the CSTC input shaft 42. Once the lock-up device is engaged and rigid rotation between the CSTC input shaft 42 and CSTC output shaft 43 is achieved, the working fluid in the CSTC is preferably drained to minimize CSTC losses during full speed continuous operation.

Figure 7:
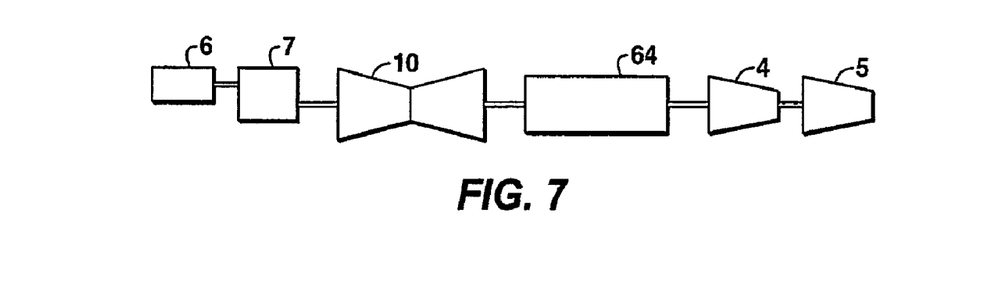
FIG. 7 is a schematic view of another exemplary embodiment of the dual end gear compressor starting torque converter of the present invention in a string of rotating equipment.
Figure 8:
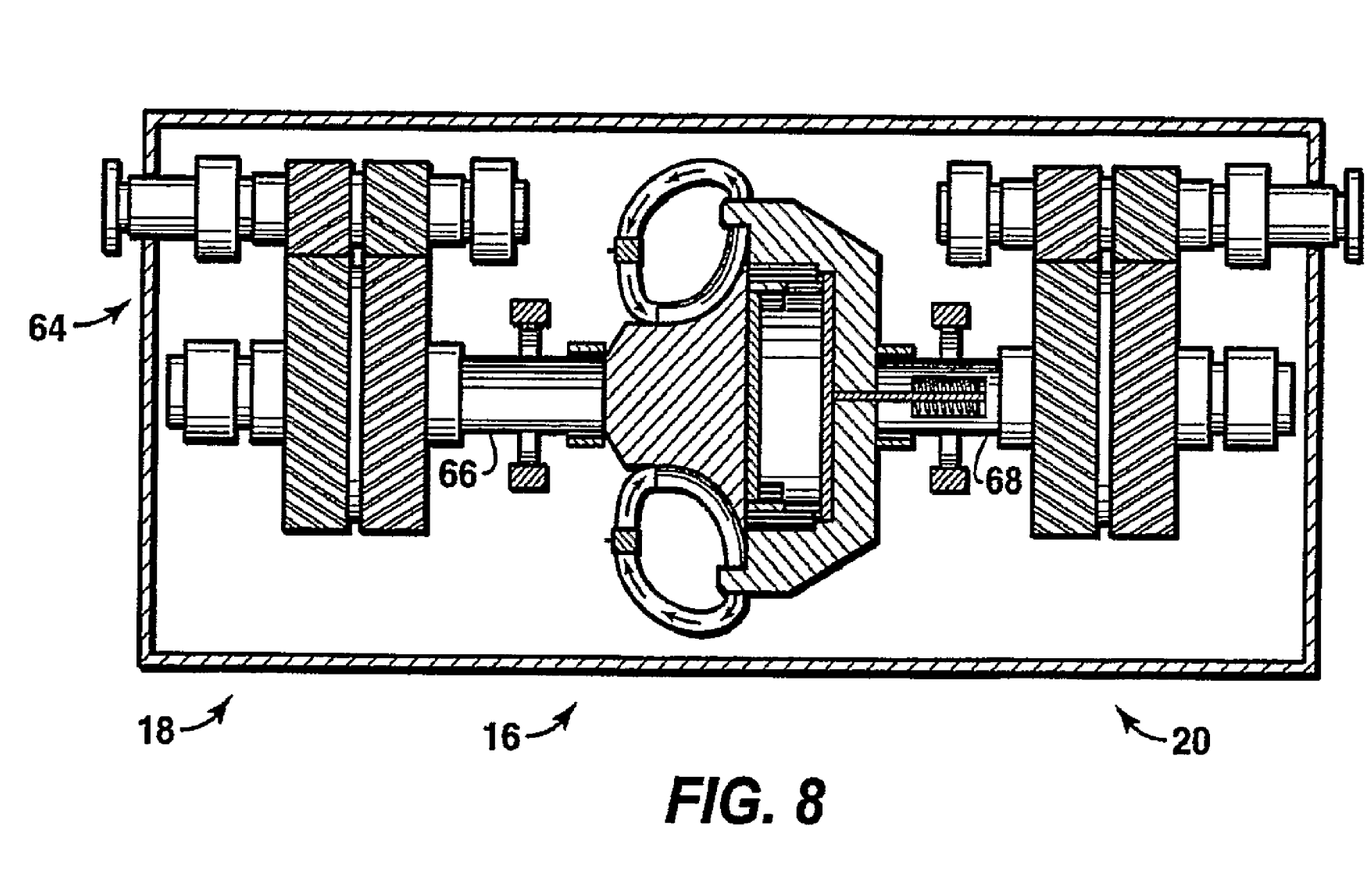
FIG. 8 is a diagram, partly in section, of the gearing and CSTC unit of the exemplary embodiment of FIG. 7.

In one alternative exemplary embodiment of the compressor starting torque converter (CSTC) of the present invention is shown in FIG. 7. This alternative exemplary embodiment comprises a gear reducer 18 and gear increaser 20 in a common housing 64 with the CSTC 16. The integration of these units is separately illustrated in FIG. 8, where the common housing 64 encloses the speed reducer gear 18, the CSTC 16 and the gear increasing unit 20. Integrating the components as a single unit simplifies the design by eliminating and combining several of the components. The output-shaft of the speed reducing gear may be integral and unitary with the input shaft 66 of the CSTC. The speed reducing gear output-shaft coupling-end radial bearing and the CSTC input shaft coupling and fluid radial bearings may be eliminated. The input-shaft 68 of the speed increasing gear may be integral and unitary with the output-shaft of the CSTC. The speed increasing gear input-shaft coupling, and its end radial bearings, as well as the CSTC output-shaft coupling and end radial bearings may also be eliminated.

The type of gearing used in the various embodiments of the present invention is dependent upon various design parameters. The gear teeth, as illustrated schematically in FIGS. 6 and 7, are preferably double helix. However, a single helix gear train may also be used, as shown in FIG. 5.

While the present invention of the invention may be susceptible to various modifications and alternative forms, the exemplary embodiments discussed above have been shown only by way of example. However, it should again be understood that the invention is not intended to be limited to the particular embodiments disclosed herein. Indeed, the present invention of the invention include all alternatives, modifications, and equivalents falling within the true spirit and scope of the invention as defined by the following appended claims.

What is claimed:

1. A dual end gear compressor starting torque converter (CSTC) for use in a string of rotating machines, said dual end gear CSTC comprising:
   a compressor starting torque converter (CSTC);
   an input end and an output end;
   a lock-up mechanism for mechanically connecting the CSTC input end to the CSTC output end at synchronous speed between the input end and the output end;
   a speed reducing gear train at the input end comprises:
     a housing surrounding and enclosing said speed reducing gear train,
     a speed reducing gear train input shaft connected to a high speed gear, said high speed gear connected to a low speed gear carried by a speed reducing gear train output shaft, said speed reducing gear train output shaft drives said CSTC
   a speed increasing gear train at the output end,
   wherein
   said speed reducing gear train comprising an output shaft integral with and common to an input shaft of said CSTC,
   said speed increasing gear train comprises an input shaft integral with and common to an output shaft of said CSTC, and
   said speed reducing gear train output shaft and said speed increasing gear train input shaft are each supported by a pair of radial bearings and a single thrust bearing.

2. The dual end gear CSTC according to claim 1, further including high speed pinion gears on said speed reducing gear train input shaft and said speed increasing gear train output shaft, and low speed gears on said speed reducing gear train output shaft and said speed increasing input shaft.

3. The dual end gear CSTC according to claim 2, wherein said gears are of single helix construction.

4. The dual end gear CSTC according to claim 2, wherein said gears are of double helix construction.

5. The dual end gear CSTC according to claim 1, wherein, said input shaft of said CSTC is a constant speed input shaft to a hydraulic pump, said pump supplies hydraulic fluid to a hydraulic turbine through adjustable guide vanes, and said hydraulic turbine is connected to said CSTC output shaft, wherein the speed of the CSTC output shaft varies from zero to full speed by adjusting said guide vanes.

6. The dual end gear CSTC according to claim 5, further including a housing enclosing said CSTC.

7. The dual end gear CSTC according to claim 6, wherein said housing includes fluid bearings radially supporting said CSTC input and output shafts, and thrust bearings axially supporting said CSTC input and output shafts.

8. The dual end gear CSTC according to claim 1, wherein said dual end gear CSTC has an output of about 80 megawatts (MW) to about 150 MW at about 2,500 revolutions per minute (rpm) to about 4,000 rpm.

9. The dual end gear CSTC according to claim 1, wherein said dual end gear CSTC has an output of about 120 megawatts at about 3,000 revolutions per minute.

10. The dual end gear CSTC according to claim 1, wherein said high speed gear and said low speed gear are of single helix construction.

11. The dual end gear CSTC according to claim 1, wherein said high speed and said low speed gears are of double helix construction.

12. The dual end gear CSTC according to claim 1, wherein said speed increasing gear train comprising:
   said speed increasing gear train input shaft;
   a low speed gear connected to said speed increasing gear train input shaft, and a high speed pinion gear driven by said low speed gear; and wherein said high speed pinion gear is connected to a speed increasing gear train output shaft.

13. The dual end gear CSTC according to claim 12, wherein said high speed gear and said low speed gear are of single helix construction.

14. The dual end gear CSTC according to claim 12, wherein said high speed gear and said low speed gear are of double helix construction.

15. The dual end gear CSTC according to claim 12, further including a housing surrounding said speed increasing gear train.

16. The dual end gear CSTC according to claim 15, wherein said speed increasing input and output shafts are supported in said housing by radial fluid bearings.

17. The dual end gear CSTC according to claim 1, further comprising a housing surrounding and enclosing said speed reducing gear train, said CSTC, and said speed increasing gear train as a unit.

18. A method of starting at least one compressor in a string of rotating power equipment, comprising the steps of:
    providing a string of rotating power equipment including a prime mover;
    connecting a speed reducing gear train to said prime mover;
    connecting a compressor starting torque converter (CSTC) to said speed reducing gear train:
    connecting a speed increasing gear train to said CSTC;
    connecting at least one compressor to said speed increasing gear train;
    starting said prime mover to produce power at a first output speed;
    reducing said first speed to a second speed lower than said first speed by said speed reducing gear train;
    transmitting power increasingly through said CSTC at output speeds from zero to said second lower than said first speed;
    increasing said second speed to a third speed higher than said second speed by said speed increasing gear train; and
    driving said compressor at said third speed
    wherein said compressor is operated under a pressurized start and the pressurized start comprises:
    operating said at least one compressor at a minimum power at start up; and
    transitioning the minimum power to a full power once the output speed of said speed increasing gear train is at said third speed.

19. The method according to claim 18, wherein the method is used to manufacture liquefied natural gas (LNG).

20. The method according to claim 19, further comprising a means to compress refrigerant, wherein said refrigerant is used to cool natural gas to a liquefied form.

21. The method according to claim 18, wherein said prime mover is a single shaft turbine.

22. The method according to claim 18, wherein said prime mover is a motor.

23. The method according to claim 18, further including a starter motor connected through a hydraulic clutch to said prime mover.

\* \* \* \* \*